United States Patent

[11] 3,593,523

| [72] | Inventors | Heniz Flaschar<br>Ludwigsburg;<br>Walter Werner, Waiblingen; Wilhelm<br>Weigert, Schwieberdingen; Manfred<br>Kramer, Fellbach-Lindle, all of, Germany |
|---|---|---|
| [21] | Appl. No. | 872,672 |
| [22] | Filed | Oct. 30, 1969 |
| [45] | Patented | July 20, 1971 |
| [73] | Assignee | Robert Bosch GmbH<br>Stuttgart, Germany |
| [32] | Priority | Nov. 6, 1968 |
| [33] | | Germany |
| [31] | | P 18 07 172.2 |

[54] ELECTROHYDRAULIC REMOTE CONTROL OF HYDRAULIC DIRECTIONAL VALVES
11 Claims, 3 Drawing Figs.

[52] U.S. Cl. .................................................... 60/52 VS,
60/DIG. 2
[51] Int. Cl. ....................................................... F15b 15/18
[50] Field of Search ............................................ 60/52 VS, 2

[56] References Cited
UNITED STATES PATENTS

| 2,774,436 | 12/1956 | Ferris ........................... | 60/52 VS UX |
| 2,977,765 | 4/1961 | Fillmore ....................... | 60/52 VS |
| 3,046,895 | 7/1962 | Berg et al..................... | 60/52 VS X |

*Primary Examiner*—Edgar W. Geoghegan
*Attorney*—Michael S. Striker

ABSTRACT: An arrangement for the electrohydraulic remote control of directional valve in which a variable displacement pump provides fluid under pressure to a load or a hydraulically operated device. Signal transducers are arranged at the pump and the load to provide electrical signals as a function of the pressures prevailing at the pump and the load. An electrical control unit compares the signals from the transducers, and is operatively connected to an electrohydraulic actuated positioning means in the pump when the signals correspond. The regulation is such that the fluid flow from the pump is controlled as a function of the load magnitude.

INVENTORS
Heinz FLASCHAR
Walter WERNER
Wilhelm WEIGERT
Manfred KRÄMER

By their ATTORNEY 3,593,523

ELECTROHYDRAULIC REMOTE CONTROL OF HYDRAULIC DIRECTIONAL VALVES

BACKGROUND OF THE INVENTION

The present invention relates to an arrangement for the electrohydraulic remote control of directional valves. These valves control fluid flow as a function of pressure between a pressure source and a load for receiving the fluid flow.

An electrohydraulic arrangement is known in the art in which the position of the load is made dependent upon the position of control lever with the aid of a servo valve. In this arrangement, the hydraulic portion possesses a bypass valve connected after a constant pump. This bypass valve regulates the pump pressure with the aid of electrical transducers continuously to a level slightly above the load pressure.

In this known arrangement, the fluid flow not required by the load is returned through the bypass valve and into the reservoir or storage tank at more or less substantially high pressure for operating positions of the servo valve. Even in the neutral position of the servo valve, the entire fluid flow passes through the bypass valve, and this also produces power losses when considering that the bypass valve must substantially throttle a predetermined minimum pressure, in order that the servo valve respond rapidly to electrical input signals. The arrangement known in the art, furthermore, has load control dependent solely upon direction, and consequently the arrangement is limited to a particular application situation.

Accordingly, the object of the present invention is to provide an arrangement for electrohydraulic remote control of hydraulic directional valves, through which the fluid flow is controlled with the least possible power losses.

This object of the present invention is achieved by providing that the pressure source be in the form of a conventional variable-displacement pump which has an electrohydraulically actuated positioning arrangement. Signal transducers are provided for transmitting signals dependent upon the pump pressure and the load pressure. The electrical signals from the transducers are compared by an electrical control unit which is operatively connected with the positioning arrangement of the displacement pump, when the electrical signals influence each other or correspond to each other.

Through this arrangement of the present invention, the least possible power losses are incurred in all cases of operation, and accordingly an effective control system is realized.

SUMMARY OF THE INVENTION

An arrangement for the electrohydraulic control of directional valves in which fluid flow from a variable-displacement pump is regulated as a function of load connected to the pump. The pump includes electrohydraulic actuated positioning means which may be constructed in the form of differential piston. The load receives the fluid pumped under pressure and may be in the form of a hydraulically operated device. Signal transducers are provided for the pump and the load for the purpose of indicating the pressures prevailing at these elements. An electrical control unit is connected to the signal transducers and compares the output signals therefrom. When the signals from the transducers agree quantitatively or correspond to each other, the control unit is operatively connected to the electrohydraulic actuated positioning means.

The novel features which are considered as characteristic for the invention are set forth in particular in the appended claims. The invention itself, however, both as to its construction, and its method of operation, together with additional objects and advantages thereof, will be best understood from the following description of specific embodiments when read in connection with the accompanying drawing.

DESCRIPTION OF THE PREFERRED EMBODIMENTS

Figure 1:
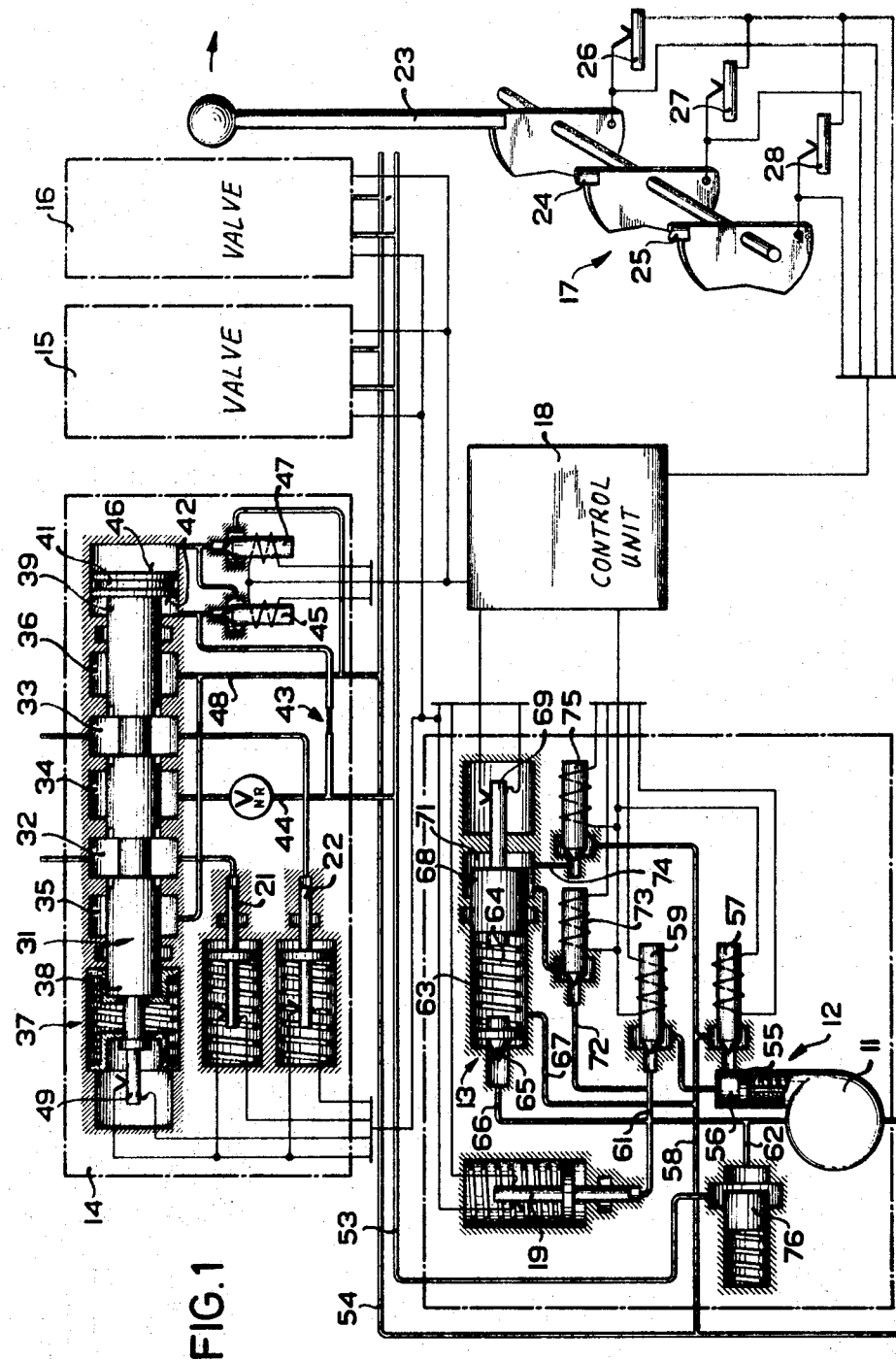
FIG. 1 is a functional schematic diagram and shows an arrangement for the electrohydraulic remote control of hydraulic directional valves and a variable-displacement pump, in accordance with the present invention.

Referring to he drawing, FIG. 1 consists essentially of a variable-displacement pump 11 with an electrohydraulic positioning arrangement 12, and electrohydraulic actuated valve 13, three identical directional valves 14, 15 and 16 with electrohydraulic actuation, an operating unit or apparatus 17, an electrical control unit 18, a signal generator or transducer 19 at the pressure side of the pump, two signal generators or transducers 21 and 22 which are operated independency of the load, as well as the required hydraulic and electrical interconnections. The electrical control unit can, of course, also be constructed in the form of an electronic control circuit.

The operating unit or apparatus 17 has three control levers 23, 24 and 25 which are deflectable or movable to both sides from their neutral position. A signal generator 26, 27 and 28 is provided with each control lever and for the corresponding control slides or spools of the directional valve 14, 15 and 16. The signal generators or signal transducers 26, 27 and 28 are connected to the electrical control unit 18 through electrical interconnecting lines.

Of the three directional valves 14, 15 and 16, only the valve 14 is shown in detail in the drawing, for the purpose of maintaining clarity and facilitating understanding of this system.

The valve 14 has a control slide or spool 31 which isolates or blocks off two load chambers 32 and 33 against an inflow chamber 34 and two return flow chambers 35 and 36, in the neutral position of the control slide 31. A double-acting return mechanism 37 at one end 38 of the control slide 31, maintains the latter centered in the neutral position. At the other end 39, a differential piston 41 is provided. The smaller area side 42 of the differential piston 41 communicates with an inflow channel 44 through an orifice or throttle device 43. This side 42 of the piston, furthermore, communicates with the larger area side 46 of the piston, through an electromagnetic valve 45. The larger area side 46 of the piston, moreover, communicates with a return flow channel 48 through another electromagnetic valve 47. The magnetic coils or electromagnetic valves 45 and 47 are connected with the electrical control unit 18. At the end of the control slide where the return mechanism 37 is carried, an electrical signal or generator transducer 49 is, furthermore, provided. This signal transducer 49 is also connected to the electrical control unit 18. The signal transducers or generators 21 and 22 are also connected or located at the load chambers 32 and 33. These transducers 21 and 22 provide electrical signals dependent upon the prevailing pressure of a double-acting load unit. The signal generators or transducers 21 and 22 are electrically connected to the control unit 18.

The inflow channel 44 in the directional valve 14 connects the inflow chamber 34 with an inflow line 53 from the variable-displacement pump 11. The return flow channel 48, on the other hand, connects the return flow chambers 35 and 36 with a return flow line 54 leading to the storage tank or reservoir.

The directional valves 15 and 16 are, similarly, connected with the inflow line 53, the return flow line 54, and the electrical control unit 18.

The variable-displacement pump 11 has a positioning device 12 with a piston 55 subjected, on one side, to fluid pressure for stroke displacement purposes. Its pressure space 56 is connected with a return flow channel 58, through a second electromagnetic valve 57, whereas the pressure space 56 is connected, through a first electromagnetic valve 59 and a channel 61, with a pressure channel 62 extending from the variable-displacement pump 11. An electrohydraulic displaceable pressure-limiting valve 63 is connected in parallel to the positioning arrangement 12, and between the pressure channel 62 and the return flow channel 58. The closure element 65 which is spring loaded through a spring 64, separates the channel 66 on the pressure side, from the return flow channel 67. The spring 64 abuts the displaceable piston 68 which has an electrical signal generator or transducer 69 providing an electrical signal dependent upon the displacement of the piston. The piston 68 projects into a pressure space 71 which connects a channel 72 with the channel 61, through an electromagnetic valve 73. Another channel 74 extends from the pressure space 71, through the electromagnetic valve 75, and to the return flow channel 58. The signal transducer 19 subjected to the pressure in the pressure channel 62, provides electrical signals dependent upon the pump pressure. The signal transducer 19, the signal generator 69 at the piston 68, the two electromagnetic valves 73 and 75 of the adjustable pressure-limiting valve 63, and the two electromagnetic valves 57 and 59 of the positioning arrangement 12, are all electrically connected with the control unit 18. A pressure-retaining valve 76 is situated in the pressure channel 62 which is connected with the inflow line 53.

In the operation of the arrangement described above, the variable-displacement pump 11 has its stroke in the zero position for the neutral positions of all control levers 23, 24 and 25. In this position of the variable-displacement pump 11, flow prevails solely for the actuation of the positioning arrangement 12, and the fluid flow under these conditions passes through the closure element 65 of the adjustable pressure-limiting valve 13 and into the return flow channel 58 at substantially no pressure.

When the control lever 23 is deflected in the direction of the arrow shown in the drawing, the signal transducer 26 becomes actuated. This signal generator 26 transmits a signal through the electrical control unit 18 for the simultaneous control of the adjustable pressure-limiting valve 13, the directional valve 14, and the variable-displacement pump 11, which operate in sequence described in the following manner.

The actuated signal transducer or signal generator 26 opens, through the electrical control unit 18, the electromagnetic valve 73, whereas the electromagnetic valve 75 remains closed. The fluid flowing into the pressure chamber 71, displaces the piston 68 against the force of the spring 64, until the signal transducer 69 indicates that a somewhat higher pressure prevails than that indicated by the signal transducer 21. Such prevailing pressure, however, is to be at least of the amount required for the control pressure for the pump stroke displacement and the direction valve actuation. The electromagnetic valve 73 closes again subsequently. The adjustable pressure-limiting valve 13 fulfills, thereby, two functions: In one of its functions, the pressure-limiting valve 13 conducts the fluid required to actuate the variable-displacement pump 11 into the return flow channel 58, when all control levers 23, 24 and 25 are in their neutral position. In its other function, the valve 13 ensures that the variable-displacement pump 11 serves as a pressure-limiting valve. In order to achieve the latter function the transducers 69 and 19 are dependent on each other and the pressure associated with the signal transducer 69 is set somewhat higher than the respective limiting pressure acting during the pump stroke decrease. Aside from this, the adjustable pressure-limiting valve 13 operates together with the pressure-retaining valve 76, which is required only when the load pressure fails or is too low. Thus, the pressure-limiting valve 13 cooperates with the pressure-retaining valve 76 to provide the required control pressure for the variable-displacement pump 11, which is always available when the control lever 23 is deflected.

The regulation of the control slide or spool 31 occurs simultaneously with the control of the pressure-limiting valve 13, in accordance with the deflection of the control lever 23. The signal transducer 26 at the control lever 23 and the signal transducer 49 at the control slide 31 provide signals of identical magnitude for identical positions of their mechanical elements to which they are secured, and when such identity in signals is realized, the electronic control unit 18 retains the electromagnetic valves 45 and 47 closed. As a result, the differential piston 41 at the slide 31 is hydraulically blocked. Through deflection of control lever 23 in the direction of the arrow shown, this balance is upset, and the electromagnetic valve 47 becomes opened whereas the electromagnetic valve remains closed. The fluid acting upon the smaller area side of the differential piston 41, moves the control slide 31 towards the right, since the larger side of the differential piston 41 becomes unloaded to the return flow channel 48. Through the motion of the control slide 31, the latter initially connects, through fine control chamber for bevel arrangement, the inflow chamber 34 with the load chamber 32, and the other load chamber 33 with the return flow chamber 36. The control slide 31 moves, thereby, towards the right until the signals from the transducers 49 and 26 are in agreement. When that case has been attained, the electrical control unit 18 closes again the electromagnetic valve 47 and blocks hydraulically, thereby, the control slide 31 into its instantaneous or prevailing position.

The regulation of the variable-displacement pump 11 is made dependent upon the load pressure, together with the control of the adjustable pressure-limiting valve 13 and the control slide 31 through which such regulation of the pump is realized. The regulation becomes first initiated, however, when the load pressures exceed the so-called control pressure throttled by the pressure-limiting valve 13 or the pressure-retaining valve 77. This can be accomplished, for example, through presetting of the signal transducer 19. The pressure indication provided by the signal transducer 21, becomes compared with the signal output of the transducer 19 at the pressure side of the pump. The comparison is performed by the electrical control unit 18, and the latter controls the positioning arrangement 12. Assume that the signal transducer 19 provides a signal somewhat higher than the output of the signal transducer 21, due to pressure losses in the inflow line 53 and directional valve 14, as well as due to a small additional preset voltage. In that event, the electrical control unit 18 retains the electromagnetic valves 57 and 59 closed, under these balanced conditions. When the flow rate of the variable-displacement pump 11 is too small, the pressure indicated by the signal transducer 19 drops, and the electromagnetic valve 59 becomes opened. The fluid pressure acting upon the piston 55 displaces the pump stroke mechanism in the direction for increasing the flow rate. If, conversely, the flow rate is too large, the pressure indicated through the output transducer 19 increases, and as a result the electrical control unit 18 opens the electromagnetic valve 57, whereas the electromagnetic valve 59 remains closed. The variable-displacement pump 11 becomes, thereby, set in the direction for zero flow rate.

When the control lever 23 is now returned towards the left and into its neutral position, the electrical control unit 18 opens the electromagnetic valve 45, on the basis of the signal outputs of the transducers 26 and 49, whereas the electromagnetic valve 47 remains closed. As a result, the fluid pressure moves the control slide 31 back into the direction for the neutral position corresponding to the control lever position provided, due to the differential action of the piston 41. The variable-displacement pump 11 becomes, thereby, also regulated as a function of load, in the manner described above. In the neutral position of the control lever 23, the pressure-limiting valve 13 controls the pump stroke displacement so that the required flow rate takes place without substantial pressure with no substantial accompanying power losses.

The control slide 31, with the aid of the control lever 23, can also be moved towards the left and out of its neutral position, in a corresponding manner. The control of the adjustable pressure-limiting valve 13, as well as the regulation of the variable-displacement pump 11 as a function of load, is carried out in a corresponding manner. The signal transducer 22 for the variable-displacement pump regulation is thereby solely a sufficient criteria. The electromagnetic valves 45 and 47 are opened and closed in accordance with the desired direction of the control lever deflection.

When the directional valve 15 becomes actuated together with the directional valve 14, the magnitude of the flow within the line 53 is determined by the largest prevailing load pressure, and becomes distributed in accordance with the prevailing load pressures and control slide positions. Evidently, the variable-displacement pump 11 has to be dimensioned in such a manner so that its maximum delivery capacity is considerably greater than the maximum fluid flow which can pass through the fully opened valve 14, so that, if valve 15 requires a pressure greater than the pressure at valve 14, the latter will act as a throttle valve and the necessary pressure will build up in the conduit 53 so that valves 14 and 15 will be provided with pressure fluid.

For safety reasons, the electromagnetic valves 45, 47; 73, 75; and 57, 59 are all opened when the electrical control unit is disconnected or drops out of the circuit. When this situation occurs, the double-acting return mechanism 37 returns the control slide 31 into its neutral position and blocks hydraulically a load. The variable-displacement pump 11 is transferred to zero stroke position, and the pressure-limiting valve 13 permits fluid flow without pressure for the pump position.

Figure 2:
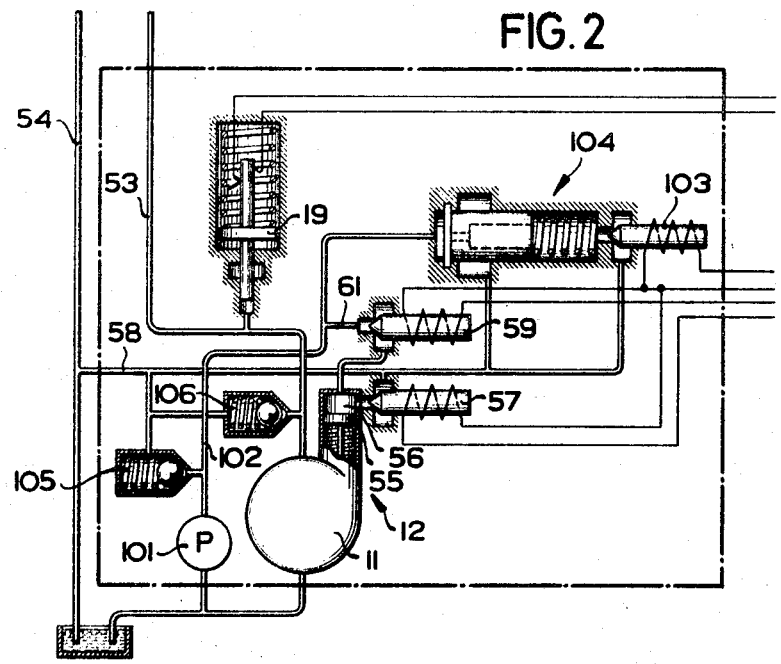
FIG. 2 is a functional schematic diagram of a portion of the arrangement of FIG. 1 and shows a further embodiment for controlling the variable-displacement pump.

In the embodiment of FIG. 2, a feed pump produces the control pressure required for the arrangement. In this embodiment, parts which are identical to those in FIG. 1, are assigned identical reference numerals.

The embodiment of FIG. 2 differs from that of FIG. 1 essentially through the inclusion of the feed pump 101 arranged at the variable-displacement pump. A channel 102 from the pressure side of the feed pump 101, leads to the channel 61 of the positioning arrangement 12. In parallel with the positioning arrangement 12 is a precontrolled transfer valve 104 between the channel 102 and the return flow channel 58. The transfer valve 104 is precontrolled through an electromagnetic valve 103. A pressure-limiting valve 105 for determining control pressure, secures the channel 102, whereas the variable-displacement pump 11 is associated with a pressure-limiting valve 106.

The functional operation of the embodiment of FIG. 2 corresponds considerably to that of FIG. 1. In contrast with the arrangement of FIG. 1, the variable-displacement pump 11 produces no control oil flow at zero flow rate from the variable-displacement pump 11, since the feed pump 101 serves this purpose. In the neutral position of all control levers 23, 24 and 25, the feed pump 101 is unloaded through the transfer valve 104 and to the return flow channel 58. Upon actuating a control lever, the electronic control unit 18 closes the transfer valve 104, and the pressure-limiting valve 105 determines the control pressure. The latter can then act upon the piston 55, through the channel 61, the electromagnetic valve 57, and the pressure chamber 56. The piston 55 is provided in the positioning arrangement 12. In the installation of FIG. 2, the regulation of the variable-displacement pump as a function of load may be made to provide pressures, furthermore, which are below the control pressure provided through the pressure-limiting valve 105. The control pressure is limited through the required minimum pressure for the actuation of the directional valves.

Figure 3:
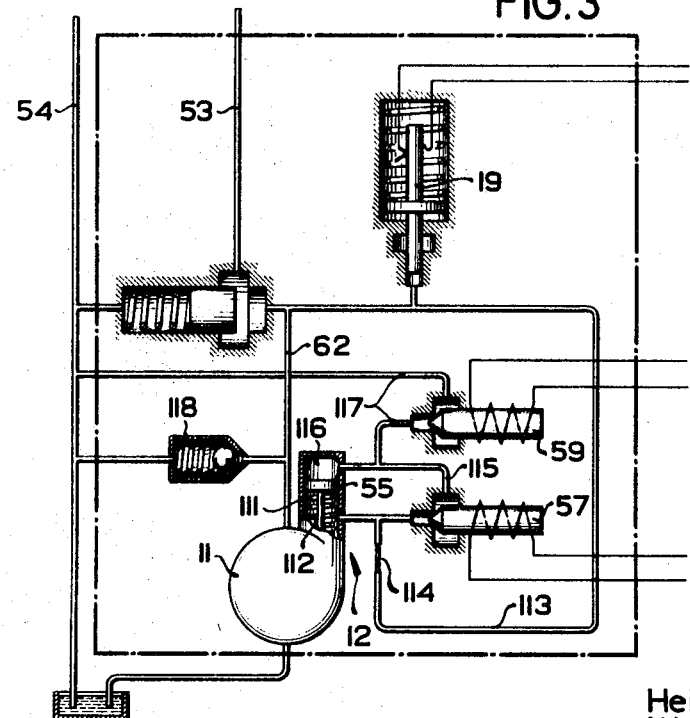
FIG. 3 is a functional schematic diagram of a portion of the arrangement of FIG. 1 and shows another embodiment differing from that of FIG. 2 for controlling the variable-displacement pump.

In the embodiment of FIG. 3, the control oil flow required for the positioning arrangement is conducted directly to a return flow through electromagnetic valves, so that an additional electrohydraulic actuated valve is omitted or drops out. Identical parts in the embodiment of FIG. 3 with those in FIG. 1, are represented with identical reference numerals.

The embodiment of FIG. 3 differs from that of FIG. 1 essentially in another method for switching or controlling the electromagnetic valves 57 and 59 in relation to the piston 55 of the positioning arrangement 12. The piston 55 is constructed in the form of a differential piston, and the smaller area side of this piston borders a chamber 111 which contains a spring 112. The chamber 111 connects a channel 113 with the pressure channel 62, through a throttling device or orifice 114. At the same time, the chamber 111 connects a channel 115 with the chamber 116 bordered by the larger area side of the differential piston 55, through the electromagnetic valve 57. The chamber 116, furthermore, is connected with the return flow line, through a channel 117 and the electromagnetic valve 59. A pressure-limiting valve 118 secures the variable-displacement pump 11.

The operation of the embodiment of FIG. 3 corresponds largely to that of FIG. 1. In contrast with the installation or arrangement of FIG. 1, the electromagnetic valves 57 and 59 are open in the neutral position of all control levers 23, 24 and 25. Through the spring 112, the variable-displacement pump 11 is substantially set to zero flow rate. The control oil flow from the variable-displacement pump 11 reaches solely into the return flow line 54 from the pressure channel 62, through the channel 113, the throttling device 114, the electromagnetic valve 57, the channel 115, the electromagnetic valve 59 and the channel 117.

When the control lever 23 is deflected out of its neutral position, the electromagnetic valve 59 closes, whereas the electromagnetic valve 57 remains open. The variable-displacement pump 11 becomes set in the direction of increasing flow rate until the signal output from the transducer 19 reports a somewhat higher pressure than that indicated through the signal transducer 21. The control pressure, however, has a minimum value for the pump stroke displacement and the directional valve actuation. When this situation occurs, the electromagnetic valve 57 also closes and blocks hydraulically the positioning arrangement 12. Furthermore, the variable-displacement pump 11 becomes regulated as a function of load, through the signal outputs from the transducers 19 and 21, 22, and through actuation of the electromagnetic valves 57 and 59.

The embodiment of FIG. 3 has an advantage over that of FIG. 1, in that an electrohydraulic adjusted valve drops out or is omitted, and the resetting of the variable-displacement pump is performed hydraulically. However, this embodiment requires a somewhat more complex positioning arrangement with differential piston.

The embodiment of FIG. 3 can be modified without difficulties so that the control oil flow is produced through a feed pump, in accordance with FIG. 2. In hat event, a variable-displacement pump can be used which may be entirely reset to zero flow rate, and a pressure-retaining valve could also be omitted.

It will be understood that each of the elements described above, or two or more together, may also find a useful application in other types of constructions differing from the types described above.

While the invention has been illustrated and described as embodied in remote control of hydraulic directional valves, it is not intended to be limited to the details shown, since various modifications and structural changes may be made without departing in any way from the spirit of the present invention.

What we claim as new and desire to be protected by Letters Patent is set forth in the appended claims.

1. An arrangement for electrohydraulic remote control of valves, comprising, in combination, variable-displacement pump means for providing fluid under pressure; electrohydraulic actuated positioning means in said variable-displacement pump means; load means for receiving said fluid from said variable-displacement pump means; first signal transducer means communicating with said variable-displacement pump means and providing a signal dependent upon the fluid pressure at said variable-displacement pump means; second signal transducer means communicating with said load means and providing a signal dependent upon the fluid pressure at said load means; and control means connected to said first and second signal transducer means for comparing said signals therefrom, said control means being operatively connected to said positioning means for controlling fluid flow from said variable-displacement pump means to said load means as a function of the magnitude of said load means.

2. The arrangement as defined in claim 1 including electrohydraulically actuated valve means connected in parallel with said positioning means; and means for operatively connecting said electrohydraulically actuated valve means with said control means.

3. The arrangement as defined in claim 1 wherein said electrohydraulic actuated positioning means comprises piston means; a pressure chamber communicating with said piston means; first electromagnetic valve means connected to said pressure chamber; first fluid channel means connected to first electromagnetic valve means and communicating with said pressure chamber through said first electromagnetic valve means; second electromagnetic valve means connected to said pressure chamber; and return flow channel means connected to said second electromagnetic valve means, said return flow channel means communicating with said pressure chamber through said second electromagnetic valve means.

4. The arrangement as defined in claim 2 wherein said electrohydraulically actuated valve comprises an adjustable pressure-limiting valve with spring-loaded closure means; channel means communicating with the pressure side of said pump means; and return flow channel means, said pressure-limiting valve separating said channel means communicating with the pressure side of said pump means from said return flow channel means through said closure means.

5. The arrangement as defined in claim 4 including a piston in said pressure-limiting valve; spring means for spring loading said closure means and abutting said piston on one side thereof; a pressure chamber on the other side of said piston lying opposite to the side abutted by said spring means; first electromagnetic valve means connected with said pressure chamber; pressure channel means communicating with the pressure side of said pump means, said pressure channel means communicating with said pressure chamber through said first electromagnetic valve means; second electromagnetic valve means connected with said pressure chamber; and return flow channel means connected with said second electromagnetic valve means, said return flow channel means communicating with said pressure chamber through said second electromagnetic valve means.

6. The arrangement as defined in claim 5 including third signal transducer means arranged at said piston; and means for operatively connecting said first and second electromagnetic valves with said control means.

7. The arrangement as defined in claim 4 including a pressure channel communicating with said pump means; and a pressure-retaining valve in said pressure channel.

8. The arrangement as defined in claim 2 including feed pump means with pressure channel, said electrohydraulically actuated valve controlling said pressure channel of said feed pump and being operatively connected to said control means.

9. The arrangement as defined in claim 8 including pressure-limiting valve means for the pressure sides of said pump means and said feed pump.

10. The arrangement as defined in claim 1 wherein said electrohydraulic actuated positioning means comprises a differential piston; spring means for maintaining said differential piston in a zero reset position; a first chamber communicating with one side of said differential piston; first electromagnetic valve means communicating with said first chamber; return flow line means connected with said first electromagnetic valve means, said return flow line means communicating with said first chamber through first electromagnetic valve means; a second chamber communicating with the other side of said differential piston; second electromagnetic valve means connected between said first chamber and said second chamber; and pressure channel means communicating with the pressure side of said pump means, said second chamber communicating with said pressure channel.

11. The arrangement as defined in claim 1 including discharging means for bypassing the fluid for positioning said variable-displacement pump; said discharging means being arranged with said positioning means.